Figure 1:
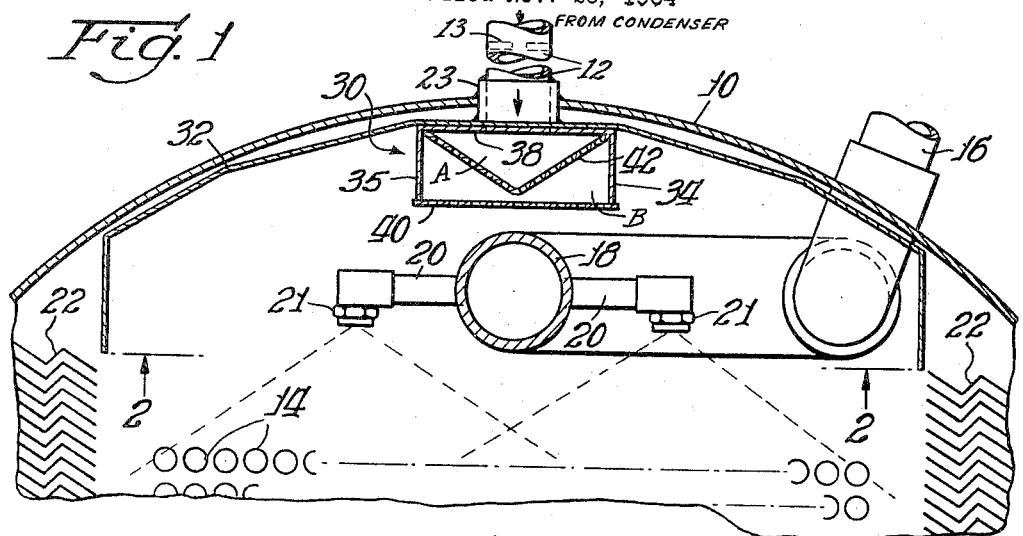

May 2, 1967

P. EDBERG 3,316,735

REFRIGERANT DISTRIBUTION FOR ABSORPTION REFRIGERATION SYSTEMS

Filed Nov. 25, 1964

Inventor:
Per Edberg
By: Thomas B. Hunter Atty.

United States Patent Office 3,316,735
Patented May 2, 1967

3,316,735
REFRIGERANT DISTRIBUTION FOR ABSORPTION REFRIGERATION SYSTEMS
Per Edberg, York, Pa., assignor to Borg-Warner Corporation, Chicago, Ill., a corporation of Illinois
Filed Nov. 25, 1964, Ser. No. 413,695
2 Claims. (Cl. 62—476)

This invention relates generally to absorption refrigeration systems, and more particularly to an improved means for distributing refrigerant as it flows from the condenser into the evaporator.

It will be appreciated that there are several different conventional arrangements used in absorption refrigeration systems. For purposes of illustration only, the description herein will relate to a design comprising a pair of shells arranged one on top of the other, it being understood that the invention is applicable to single shell and various other configurations. In the example, the lower shell houses two tube bundles, the evaporator and the absorber, operating at a pressure on the order of 6.3 mm. of Hg absolute ($1/120$ atmosphere) while two tube bundles in the upper shell provide a generator and a condenser, said shell being maintained at a pressure of approximately 75 mm. of Hg absolute ($1/10$ atmosphere).

As is well-known to those skilled in the art, operation of an absorption refrigeration system depends on two factors: a refrigerant that boils at a temperature below that of the liquid being chilled and an absorbent possessing great affinity for the refrigerant. At the pressures maintained within the two shells, the water flowing over the bundle from the evaporator boils and extracts heat from the chilled liquid flowing through the tube bundle. Several refrigerant-absorbent combinations are used commercially, but this specification will make reference to a system employing water as the refrigerant and a hydroscopic brine such as LiBr as the absorbent, it being understood that the invention is applicable to other refrigerant-absorbent combinations.

A liquid, usually water, to cool the conditioned space or process is chilled as it passes through the evaporator tubes by giving up heat to the refrigerant flowing on the outside of the tubes. The heat removed from the chilled liquid causes the refrigerant (water) to evaporate since it is at a pressure (with a corresponding boiling temperature) lower than the leaving chilled water temperature. For example, water is chilled from 54° F. to 44° F. with the evaporator at 6.3 mm. of Hg absolute; this corresponds to a 40° F. boiling point for the refrigerant.

The LiBr solution which is circulated within the absorber section located underneath the evaporator has a great affinity for the water vapor released in the evaporator. This vapor flows downwardly and is brought into contact with the intermediate strength solution flowing over the outside of the absorber tubes, thus diluting the solution. The heat of absorption generated in this process is removed by condenser water from a cooling tower or other source flowing through the absorber tubes.

Dilute solution from the absorber is pumped to the generator by a generator pump. Along its path to the generator it passes through a heat exchanger where it is regeneratively heated by hot, concentrated solution flowing from the generator to the absorber. The dilute solution from the absorber flows over the outside of the generator tubes, and a portion of the refrigerant in the solution is vaporized by a heat exchange medium, usually steam, passing through the generator tubes. When the refrigerant is driven off, the solution is concentrated and the concentrated solution flows by gravity through the heat exchanger (where it is cooled regeneratively by the cold dilute solution) to the suction side of the absorber pump.

The refrigerant vapor released from the boiling action in the generator flows upwardly and is brought into contact with the outside of the condenser tubes. The vapor gives up its heat of condensation to the condenser water passing through the tubes and the condensed vapor is passed through a conduit to a distributor located above the absorber coil in the lower shell.

The present invention relates more specifically to a refrigerant distributor to control the violent flashing of refrigerant as it is introduced into the evaporator. It should be understood that this background description is merely for the purpose of setting forth the principal elements of a typical absorption refrigeration machine, and provides a basis for a clear understanding of the environment in which the improved distributor is used.

When the refrigerant flows from the condenser, where it is under a pressure of approximately $1/10$ atmosphere (75 mm. of Hg), to the evaporator, where the pressure is approximately $1/120$ atmosphere (6.5 mm. of Hg), an expansion process takes place. The conduit or flow pipe through which the refrigerant is conducted from the condenser to the evaporator is provided with a fluid resistance in the form of an orifice so as to permit all of the refrigerant, plus a small amount of vapor or inert gases that may otherwise collect in the upper shell, to pass therethrough. In expanding from the relatively high condensing pressure to the relatively lower evaporator pressure, approximately 7% of the refrigerant (water) flashes from liquid to vapor. Because of the low pressure existing in the evaporator, this flashing represents a considerable volume of vapor.

For an example, in a 100 ton unit, approximately 20 pounds of refrigerant would be flowing from the condenser to the evaporator under normal operating capacity. As mentioned above, 7% of this refrigerant, or 1.4 pounds per minute, would flash to water vapor. It will be appreciated that inasmuch as the specific volume of water vapor at a pressure of 6.3 mm. of Hg absolute is approximately 2,424 cubic feet per pound, this results in a flow of nearly 3,400 cubic feet per minute of vapor into the evaporator section. A portion of this vapor is generated in the interconnecting pipe between the orifice and the evaporator so that a mixture of water vapor and liquid is introduced into the evaporator from the flow pipe. The velocity of emergence into the evaporator under these conditions can be as high as 500 feet per second. Moreover, there is, in addition to the above, a further expansion as the mixture of vapor and liquid enters the evaporator shell which is quite explosive. This is due to the fact that the expansion is never complete within the flow pipe itself. It is this high velocity and explosive energy as the mixture enters the evaporator which requires special design considerations.

While the evaporator chamber is equipped with devices, commonly referred to as eliminators, for preventing water droplets from passing directly from the evaporator to the absorber section, while at the same time permitting a free flow of vapor therethrough, the high energy and velocity condition described above tends to drive water droplets through the eliminators with corresponding thermodynamic losses.

The present invention is concerned with apparatus, hereinafter referred to as a refrigerant distributor, for controlling the explosive effect of the refrigerant as it enters the lower pressure evaporator-absorber shell. Its purpose is to break up the refrigerant into smaller droplets and to permit the flashing vapor to be generated in successive stages rather than all at once.

It is, therefore, a principal object of the invention to provide an improved refrigerant distribution means for controlling rapid generation of refrigerant vapor as it is introduced into the evaporator.

Figure 2:
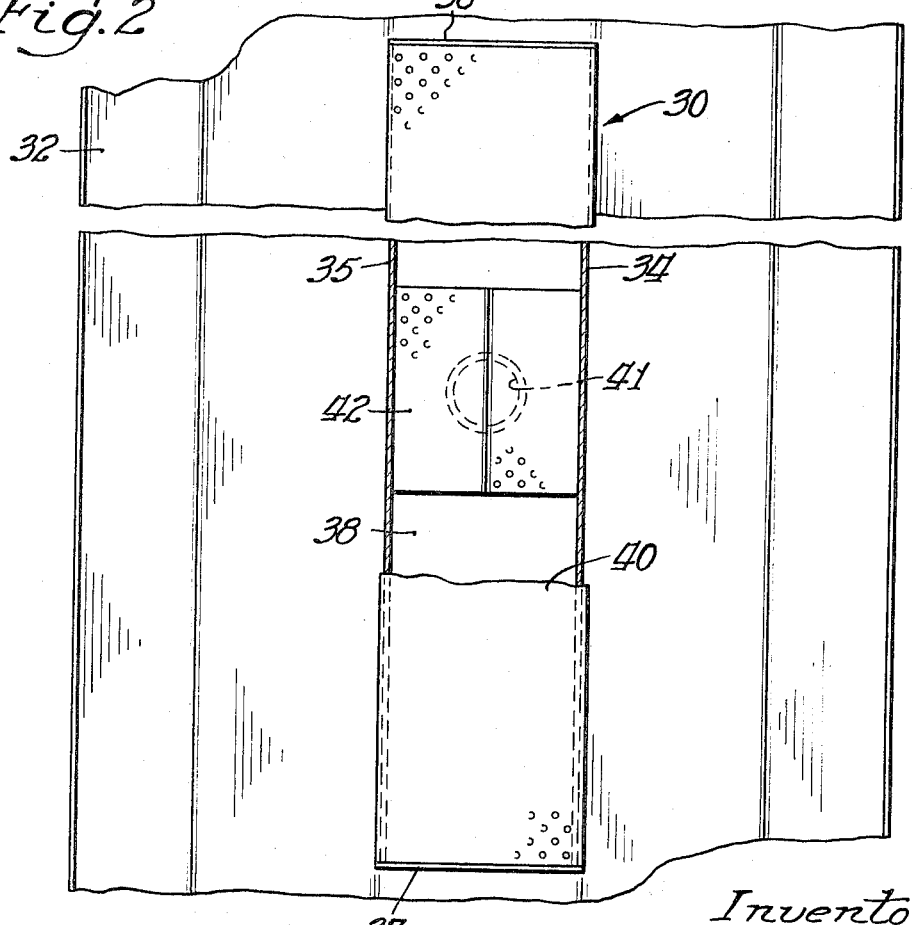

Additional objects and advantages will be apparent from the following detailed description taken in conjunction with the drawings wherein:

FIGURE 1 is a partial cross-section view of the upper portion of the evaporator-absorber shell, and FIGURE 2 is a view of the distributor and shield taken along the plane of line 2—2 of FIGURE 1, with the spray header not shown.

Referring now to FIGURE 1, reference numeral 10 designates a cylindrical shell enclosing the evaporator and the absorber (not shown). The refrigerant condensed in the condenser section of the upper shell flows through a conduit 12 which is provided with a restrictive orifice 13 to maintain the required pressure differential between the shells to the evaporator section in the lower shell. In the evaporator, the refrigerant is flowed over the outside of the evaporator or chilled water coil 14 to abstract heat from the water circulating therethrough. Liquid refrigerant which is not vaporized while it is flowing over the chilled liquid coil is collected in a pan (not shown) and flows to a refrigerant pump, the discharge side of which is connected to conduit 16 and a supply header 18. The refrigerant then passes through conduits 20 to a plurality of spray nozzles 21 disposed over the chilled water coil 14. As is conventional, means for separating liquid refrigerant from the vapor as the latter flows to the absorber section in the lower portion of the shell 10 are provided at both sides of the chilled liquid coil. These devices indicated generally at 22 are often referred to as eliminators.

The improved refrigerant distributor which is employed to control the flashing of refrigerant as it is introduced into the evaporator from the condenser is indicated by reference numeral 30. As shown most clearly in FIGURE 1, the conduit 12 from the condenser is connected to a flange 23 in the upper portion of the shell, said flange supporting the distributor 30 and a shield 32 extending over and protecting the upper portion of the shell. Distributor 30 comprises an elongated box-like housing having side walls 34, 35, end walls 36, 37, top wall 38 and a perforated bottom wall 40. The top wall is provided with an opening 41 into which the shell flange 23 extends, said flange being welded to the shield 32. Immediately below the opening into which the refrigerant flows, there is provided a generally V-shaped perforated baffle 42. The upper edges of the baffle 42 are welded to the junction of the side and top wall of the distributor and the converged portion of the baffle is disposed just above and in spaced relation from the perforated bottom wall 40.

*Operation*

It will be seen that as the refrigerant is introduced into the distributor through conduit 12, it impinges on the baffle 42 which is located directly underneath the opening 41. This action breaks up the liquid refrigerant into smaller droplets which fall through the baffle onto the perforated bottom plate 40 and from there into the evaporator section. The space, designated at A, between the top wall and the baffle functions as a first expansion zone, while the space B between the baffle and the bottom wall operates as a second expansion zone so that the vapor generation takes place in successive stages with the baffle 42 maintaining a slight pressure differential between the two zones.

While this invention has been described in connection with a certain specific embodiment thereof, it is to be understood that this is by way of illustration and not by way of limitation; and the scope of this invention is defined solely by the appended claims which should be construed as broadly as the prior art will permit.

What is claimed is:

1. In an absorption refrigeration system of the type including a generator, a condenser, an evaporator, and an absorber connected in a closed refrigeration circuit, conduit means for conducting refrigerant from said condenser to said evaporator, means defining a restrictive orifice in said conduit means, and a refrigerant distributor operatively positioned in said evaporator at the point where refrigerant is introduced therein, the improvement wherein said distributor comprises a generally box-like housing having imperforate top, side, and end walls, a perforated bottom wall, means defining an opening in said top wall through which refrigerant is introduced into said housing by said conduit means, and a substantially V-shaped perforated baffle overlying the said opening.

2. In an absorption refrigeration system of the type including a generator, a condenser, an evaporator having a chilled water coil, and an absorber connected in a closed refrigeration circuit, said evaporator and said absorber being disposed within a unitary shell which is maintained at evaporating pressure, conduit means for conducting liquid refrigerant containing a minor proportion of vapor from said condenser to said evaporator, the improvement comprising means defining a connection between said conduit into said shell; a shield member extending over the upper portion of said shell, said shield being operatively connected to and supported by said connection; a refrigerant distributor connected to said shield, said distributor comprising a generally box-like housing having imperforate top, side, and end walls, and a perforated bottom wall disposed above the chilled water coil in said evaporator; means defining an opening in said top wall through which refrigerant is directed into said housing from said conduit; and a perforated baffle disposed over said opening against which refrigerant impinges as it is delivered into said housing, said baffle and said top wall defining a first expansion zone, said bottom wall and said baffle defining a second expansion zone adjacent thereto, said baffle maintaining a slight pressure differential between said zones to reduce the violence of the expansion process.

References Cited by the Examiner

UNITED STATES PATENTS

| | | | |
|---|---|---|---|
| 2,323,186 | 6/1943 | Anderson | 62—494 |
| 3,195,323 | 7/1965 | Swearingen | 62—476 X |
| 3,210,955 | 10/1965 | Anderson et al. | 62—117 |

LLOYD L. KING, *Primary Examiner.*